Dec. 24, 1935.    C. W. FLETCHER ET AL    2,025,382
PIPE COUPLING
Original Filed Jan. 31, 1928
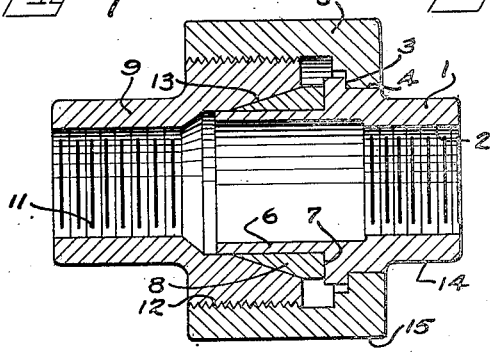
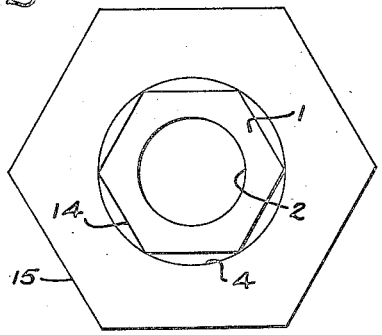
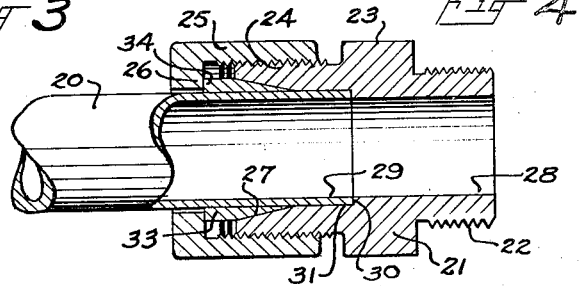
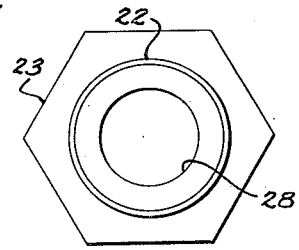
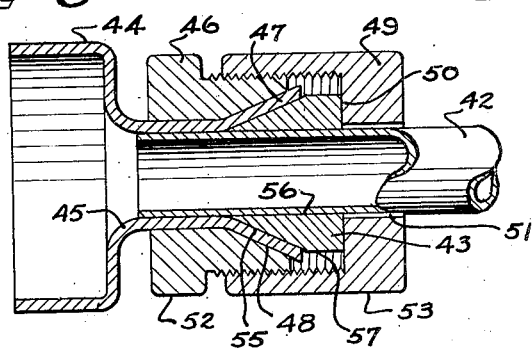
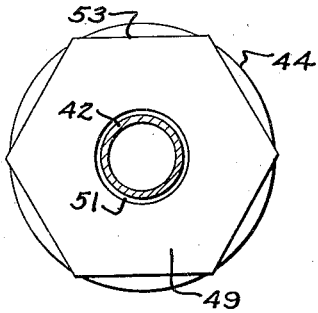
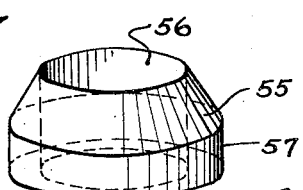
INVENTORS
C. W. Fletcher
R. H. Stone
BY
Thomas Howe ATTORNEY Patented Dec. 24, 1935

2,025,382

UNITED STATES PATENT OFFICE 2,025,382

PIPE COUPLING

Charles W. Fletcher, New York, N. Y., and R. Harry Stone, Bound Brook, N. J., assignors to Titeflex Metal Hose Co., a corporation of New Jersey Application January 31, 1928, Serial No. 250,743
Renewed November 10, 1932

2 Claims. (Cl. 285—86)

This invention relates to pipe couplings and means for positively maintaining said couplings secure against leakage caused by seepage, high pressure or otherwise. It also relates to packings used in such couplings particularly with brass or aluminum pipes.

It is therefore an object of the present invention to provide a pipe coupling which is sufficiently secure and rigid to prevent the slightest flexing of parts under the maximum stress capable of being impressed thereon through the pipes that are connected thereto and yet be sufficiently tight to prevent leakage.

Another object of this invention is to overcome difficulties due to scoring or abrading in a circumferential direction, the surfaces of pipes which are applied to couplings with which there is no screw threaded engagement, which abrasion often causes breakage when a stress is applied.

It has been found that when two metals are in engagement and at the same time rotated, one with respect to the other, especially if one metal is harder than the other, great difficulty is encountered on account of scoring of the surfaces causing lines of weakness at right angles to the line of greatest stress. This results in frequent breaking and leaking at such points. It also causes difficulty when the pipes are removed and again replaced on account of unevennesses produced in the surface by abrasions caused by the circumferential frictional engagement.

Formerly this has been alleviated to some extent by applying fibrous packings between the pipe and the couplings but these have not proven satisfactory for all purposes. The present invention therefore has for a further object the provision of a preformed packing piece composed of material which is sufficiently soft with relation to the coupling parts or pipe to obviate scoring; sufficiently hard to prevent displacement or flexing of the joint to cause leaks and yet have the proper plasticity to conform to any slight unevennesses of the coupling parts or the pipe with which the packing contacts. Heretofore packings have been arranged to be forced into the glands or boxes to conform to the general shape desired.

The present invention has for an object the preforming of a packing piece for use in a pipe coupling.

Another object is to provide a pipe coupling for metallic pipes having a packing piece which is softer than the pipe with which it contacts and the other coupling parts as hard or harder than the pipe, arranged in such a way that the coupling may be tightened through the application of a simple longitudinal motion between the pipe and the packing and without producing direct frictional circumferential contact between the pipe and the clamping parts.

Other and ancillary objects will be apparent in connection with the following specification, claims and drawing in which:

Fig. 1 is a longitudinal section of one form of my improved coupling;

Fig. 2 is an end view of the coupling of Fig. 1 viewed from the right of Fig. 1;

Fig. 3 shows a modification, partly in longitudinal section;

Fig. 4 shows an end view of the coupling of Fig. 3 viewed from the right of Fig. 3;

Fig. 5 shows another modification partly in section for a connection between a metal pipe and a flexible metallic base;

Fig. 6 shows an end view of the connection of Fig. 5 viewed from the right of Fig. 5; and Fig. 7 shows a perspective view of my improved preformed metal packing piece.

Referring now to the drawing, the coupling inside piece 1 which is usually of brass is threaded at 2 for the reception of a pipe or other connection. A shoulder 3 and collar 4 bear against the flange of the hexagon nut 5. Instead of the usual tapered surface in the coupling the inside piece is provided with a cylindrical neck 6 which terminates in shoulder 7. Arranged on this neck is the packing piece 8 composed of solid metal such as lead or babbitt which is considerably softer than that of the coupling parts against which the packing piece is compressed. This packing includes lead in its composition where high heat resistance is unnecessary but may include other soft heat resisting materials where heat is a factor.

The outer piece 9 is also provided with a pipe threaded portion 11 and another threaded part 12 for cooperating with the threads on the nut 5. Its inner surface 13 is tapered and the packing piece 8 is preformed with the same taper and preferably so proportioned as to permit the neck 6 to slide part way into the outer piece 11 whereby greater strength of the joint is provided and the parts held in proper alignment and position.

When it is desired to couple the parts together the packing piece 8 is slid over the neck 6 and the coupling parts assembled and tightened. In tightening the parts together the nut piece 5 is rotated by applying a wrench to the hexagon portion 15 while the inner piece 1 is held stationary by applying a wrench to the hexagon portion 14.

It can thus be seen that no rotation occurs between either the outer piece 11 and the packing piece 8, or the inner piece 1 and the packing piece. This aids in preventing destruction of the packing piece, as well as helping to make the joint more secure and fluid-tight.

In case any scoring takes place between any of the frictional engaging surfaces, such scoring obviously will affect the packing piece 8 and not the coupling parts, inasmuch as the packing piece 8 is considerably softer than any of the other coupling parts. If such scoring does take place or the surface of the packing piece is badly abraded or worn, so as to render it useless, after the coupling has been disassembled, it may be readily removed by sliding it off the neck-portion 6 and a new preformed packing may be slid in place.

The pipe 20 may also be securely sealed to the connection piece 21, as shown in Figure 3, through the use of the same type of preformed packing piece. The connection 21 is provided with a threaded portion 22 and the hexagon portion 23. Other threads 24 are also provided for cooperating with the nut 25 having the shoulder 26. The left-hand end of the connection 21 is arranged with internal taper portion 27. The inside diameter 28 is substantially the same diameter as the inside surface 29 of the pipe 20. The shoulder 30 is arranged on the inside of the connection 21 and the pipe 20 is caused to abut this shoulder. Also a short portion of the pipe is fitted into the surface 31 of the connection piece 21 so as to more securely and rigidly hold the pipe.

This pipe 20 is liable, by any frictional contact between the connection and the pipe, through which there is exerted any considerable degree of force to have its surface abraded or scored. The preformed packing piece 33 is shaped in such a way that it fills the space between the pipe and the tapered surface 27. The shoulder 26 on the nut 25 contacts with the flat end 34 of the packing piece 33, forcing it with a wedging action into the space between the pipe and the connection piece 21, thereby rigidly and tightly securing the pipe and the connection together. The nut piece 25 is arranged with sufficient clearance with respect to the pipe 20 as to insure that there will be no frictional contact with its surface, and the preformed packing piece 33 being composed of softer metal than the pipe 20 will readily adapt itself to unevennesses on the surface of the pipe. The pressure of the shoulder 26 on the nut 25 against this packing piece will maintain it in rigid fluid-tight contact with the connection 21. In order to insure that the connection 21 remains stationary with respect to the pipe 20 a wrench may be applied to the hexagon portion 23 and the nut 25 is positively rotated with respect thereto.

Referring to Figs. 5 and 6, a flexible metal hose may be secured to a pipe 42 by means of the same type packing piece indicated at 43. The flexible tubing may be soldered, welded or otherwise secured in an enlargement 44 on a ferrule 45, the ferrule having an inside diameter substantially the same as the outside diameter of the pipe 42 so as to provide a close fit for these parts. The piece 44 is conveniently made of copper, the rest of the coupling parts being made of comparatively hard brass except the packing ring 43 which is made of a soft metal such as lead or babbitt or other suitable material.

The connection piece 46 is slid on to the ferrule, and the end of the ferrule stretched or spun as at 47, so as to provide a conical flaring surface. The inside surface 48 of the connection piece 46 is tapered to conform to the outside surface of the conical or flare portion 47 and the packing piece 43 is formed with a tapered surface corresponding to the inside of the conical portion. The nut piece 49 is screw-threaded on to the connection piece 46 and has flange 50 bearing against the packing piece whereby the packing piece is forced into tight engagement with the ferrule and the pipe 42 causing it to conform to any slight unevennesses of these surfaces, whereby a rigid and fluid-tight joint is provided. This nut has a clearance space 51 between it and the pipe.

The coupling parts may be tightened by applying wrenches to the hexagon parts 52 and 53, the part 46 being held stationary and the part 49 rotated with respect to the pipe 42. By so tightening the coupling the only rubbing surfaces are those of the threads and the shoulder 50 against the packing piece 43. The other parts are forced together by straight pressure without relative rotation of engaging parts, and there is no rotational rubbing of the coupling parts against the pipe thereby avoiding abrasion tending to render the pipe liable to breakage at that point. With proper manipulation a thread between the two outer portions of the coupling will last substantially indefinitely and no appreciable wear will occur on the shoulder 50, due to contact with the packing piece 43.

This packing piece as will be seen (Fig. 7) comprises a cylindrical portion 57 and a tapered portion 55, a central cylindrical hole 56 extending from one end to the other. The section is shown in Figures 1, 3 and 5.

The lead or lead alloy is a satisfactory material for the packing piece where it is not subjected during use to high temperatures. When high temperatures are used other suitable materials, such as copper and the like, which are more heat resistant may be used. When copper is used it should preferably be thoroughly annealed before use, so as to render it softer than any of the other materials of which the coupling is composed.

It can thus be seen that a simple, convenient and efficient arrangement is provided for coupling pipes and other fluid-conducting members together and securely maintaining them in mechanical relation so as to avoid leakage. The packing material is properly shaped before application to the connections to insure close contact therewith, and it is composed of the proper materials to cooperate with the materials used in the coupling to aid in their useful life and prevent rapid deterioration through constant changing of connections and the coupling parts and pipe or pipes are drawn into fluid tight relation and disassembled therefrom without any rotational rubbing liable to cause abrasion and injury of the pipe or coupling parts.

It is not intended to be limited to the exact constructions and modifications shown but only to the extent indicated in the appended claims.

We claim:

1. In a pipe coupling, the combination with a metal pipe, a ferrule fitting over said pipe, a connection piece comprising means for receiving said pipe and said ferrule, one end of the ferrule being tapered and the other having an enlargement adapted to be secured to a flexible metallic pipe, said connection piece fitting over the tapered end of said ferrule, a wedge shaped metallic packing piece between said first mentioned pipe and said ferrule, and clamping means threadedly engaged with said connection piece for wedging said packing piece between the ferrule and the first mentioned pipe and securing them together, said clamping means surrounding said first mentioned pipe but out of contact therewith.

2. In a pipe coupling, the combination with a metal pipe, a ferrule fitting over said pipe, a connection piece comprising means for receiving said pipe and said ferrule, one end of the ferrule being tapered and the other having an enlargement adapted to be secured to a flexible metallic hose, said connection piece fitting over the tapered end of said ferrule, a metallic packing piece one part being cylindrical and the other part being frusto-conical in shape between said pipe and said ferrule, and a clamping nut threadedly engaged with said connection piece for wedging said packing piece between the ferrule and said pipe and securing them together, said nut surrounding said pipe but having sufficient clearance therefrom to prevent actual frictional engagement.

CHARLES W. FLETCHER.
R. HARRY STONE.